UNITED STATES PATENT OFFICE

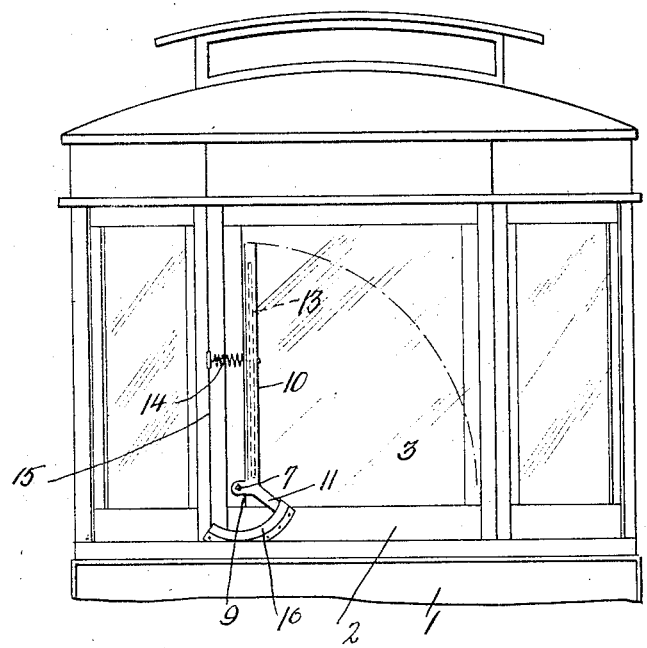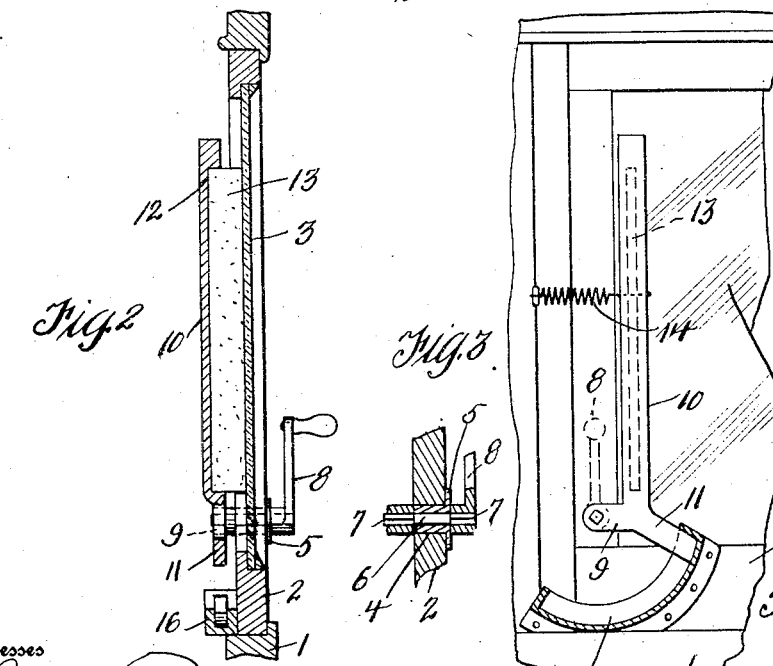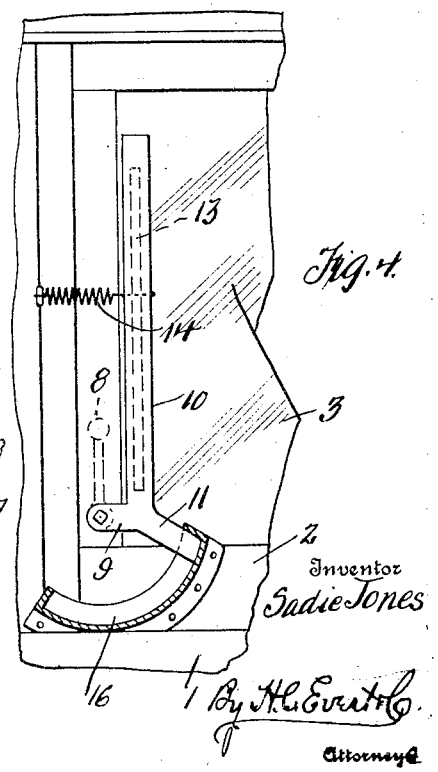

SADIE JONES, OF FINLEYVILLE, PENNSYLVANIA.

WINDOW-CLEANING DEVICE.

No. 930,185.

Specification of Letters Patent.

Patented Aug. 3, 1909.

Application filed February 1, 1909. Serial No. 475,543.

To all whom it may concern:

Be it known that I, SADIE JONES, a citizen of the United States of America, residing at Finleyville, in the county of Washington and State of Pennsylvania, have invented certain new and useful Improvements in Window-Cleaning Devices, of which the following is a specification, reference being had therein to the accompanying drawing.

This invention relates to a window-cleaning device, particularly designed for a street car for removing snow, rain, sleet and frost from the motorman's window of a car, whereby the roadway in front of the car can be readily observed by the motorman, and such accidents averted as collisions and the running down of persons.

The object of my invention is to provide a simple and durable device with which window-frames can be equipped for quickly removing such matter from the pane of glass in the window-frame as would obstruct the sight of the motorman when operating a car. The device is easily operated from the interior of the car, and its simplicity of construction permits of the device being manufactured at a comparatively small cost and installed in connection with a car window without altering the same.

The detail construction entering into my invention will be hereinafter described and then specifically claimed.

Referring to the drawings:—Figure 1 is a front elevation of a car window equipped with the device, Fig. 2 is a vertical sectional view of the same, Fig. 3 is a detail sectional view of the pivot pin of the device, and Fig. 4 is an enlarged elevation of the device partly broken away and partly in section.

In the accompanying drawings, 1 designates the end of a car having a central window-sash 2 provided with a pane of glass 3. The window-sash 2 at the lower left hand corner thereof is provided with an opening 4 and in this opening is fitted a sleeve 5 for a journal pin 6 having rectangular protruding ends 7.

On the inner rectangular end 7 of the pin 6, is a crank 8, the outer rectangular end 7 of said pin 6 having fixed thereon a lug 9 carried by a scraper arm 10, said scraper arm also having an angular extension 11. The lug 9 extends at right angles to the scraper arm 10 while the extension 11 projects at an angle of approximately 135° relative to the lug 9 or the arm 10. The arm 10 is provided with an elongated recess 12, in which is seated a resilient strip 13 of rubber, felt, or a similar cleansing material, this strip 13 projecting beyond the plane of the arm 10 and engaging with the pane of glass 3. The arm 10 is normally maintained in a vertical position, as shown in Figs. 1 and 4, by means of a coil spring 14 attached at its inner end to the arm 10, and at its other end to the window-frame 15 of the car 1. The crank 8 is so placed on the inner end of the pin 6, that when the arm 10 is in its vertical normal position as shown in Fig. 4, the crank 8 will be in the upright position as also shown in this figure, ready for use for operating the arm 10. The extension 11 heretofore referred to acts in connection with a guide member 16 to limit the movement of the arm 10 in both directions, and also to guide the arm during its movement. To this end, the guide member 16 is substantially segment-shaped, and is secured to the outer face of the lower sash rail 2. The extension 11 projects into the slot of this guide, and engages, when the arm is in the upright position, with one end wall of the slot, and when the arm is moved to the other extreme position, the said extension engages with the other end wall of the slot in the guide member, thus limiting the movement of the arm 10 in both directions. This limiting of the movement of the arm prevents the latter being thrown forcibly against the rails of the window-sash, either by the motorman in operating the arm, or by the action of the spring 14 in returning the arm to its normal position, when the motorman or operator releases his grip on the crank 8.

To operate the device it is only necessary for the operator or motorman of the car to swing the crank 8 toward the center and sill of the window-sash, and the arm 10 will describe an arc indicated by the dot and dash line of Fig. 1 of the drawings. In describing this arc the resilient strip of material 13 will cleanse the pane of glass 3 by removing rain, snow, sleet and frost therefrom, whereby the operator or motorman can see through the same. The extension 11 in connection with the guard 16 limits the movement of said arm and the spring 14 is adapted to return the arm to its normal position and maintain the same in a vertical position, always ready to be operated.

It is apparent that my device can be used in connection with the windows of locomotive cabs, the wind shields of automobiles and in connection with any pane of glass where it is essential that the same be maintained free of matter that would obstruct the view through the glass.

The device, with the exception of the resilient strip 13, can be made of light and durable metal, and of such a size as to be applicable to window-sashes of various sizes and constructions.

Having now described my invention what I claim as new, is:—

In a window cleaning device, a sleeve fixed in the window sash at one of the lower corners thereof, a pin journaled in said sleeve and extending beyond both ends of the sleeve, a crank carried by the inner end of said pin, a recessed arm having a lug extending at right angles thereto and fixed on the outer end of said pin, said arm having an extension projecting therefrom on the edge opposite to the lug, said extension projecting at an oblique angle to the arm and to said lug, a slotted guide member fixed to the lower rail of the window sash into which the extension of said arm projects, the slot in said guide member having closed ends adapted to be engaged by the extension of said arm whereby the movement of the latter is limited in both directions, a resilient strip mounted in the recess of said arm, and a spring for returning the arm to normal position and normally maintaining said arm in normal position.

In testimony whereof I affix my signature in the presence of two witnesses.

SADIE JONES.

Witnesses:
M. E. JONES,
MAX H. SROLOVITZ.